(12) United States Patent
Donnis et al.

(10) Patent No.: US 6,296,245 B1
(45) Date of Patent: Oct. 2, 2001

(54) DEVICE FOR THE PICKING AND FEEDING OF SHEETS FROM A REAM

(75) Inventors: Gian Paolo Donnis, Germano Vercellese; Attilio De Ambrogio, Cigliano, both of (IT)

(73) Assignee: Olivetti Tecnost S.p.A., Ivrea (Torino) (IT)

( * ) Notice: Subject to any disclaimer, the term of this patent is extended or adjusted under 35 U.S.C. 154(b) by 0 days.

(21) Appl. No.: 09/420,486

(22) Filed: Oct. 19, 1999

(30) Foreign Application Priority Data

Oct. 21, 1998 (IT) .................................................. 98A0897

(51) Int. Cl.[7] ................................. B65H 3/52; B65H 9/04
(52) U.S. Cl. ........................................... 271/122; 271/243
(58) Field of Search ................................... 271/162, 164, 271/167, 122, 127, 157, 243

(56) References Cited

U.S. PATENT DOCUMENTS

| | | | |
|---|---|---|---|
| 4,135,804 | * | 1/1979 | Schoppe et al. ...................... 355/3 X |
| 5,255,903 | * | 10/1993 | Parsons et al. ...................... 271/10 X |
| 5,326,091 | * | 7/1994 | Giacometto et al. ............... 271/10 X |
| 5,358,230 | * | 10/1994 | Ikemori et al. ................... 271/114 X |
| 5,863,036 | * | 1/1999 | Tanaka et al. ................. 271/10.11 X |

* cited by examiner

Primary Examiner—Christopher P. Ellis
Assistant Examiner—Kenneth W Bower
(74) Attorney, Agent, or Firm—Banner & Witcoff, Ltd.

(57) ABSTRACT

A device 100 for the feeding of sheets 14 from a ream 18, with a main rotating, feeding roller 27; a tray 13 containing the ream 18; and an auxiliary roller 130 arranged adjacent to the feeding roller 27, wherein the tray 13 is suitable for moving cyclically to bring the ream 18 into contact with the feeding roller 27, so that the latter picks one at a time the sheets 14 from the ream 18 and feeds them along a path 131; and wherein the auxiliary roller 130 is adapted for rotating in contact with the sheets 14 picked by the feeding roller 27, but without pulling them and in the direction opposite their feeding direction, the object being that of opposing the picking of double sheets from the ream 18. The device 100 is provided with an improvement consisting of a cap 141 capable of moving in sync with the cyclical motion of the tray 13 with respect to the main feeding roller 27, so as to prevent, by coming between the auxiliary roller 130 and the sheets 14, any contact between them, at least during the motion of the tray 13. In this way, the front edges 140 of the sheets 14 can access the path 131 without running the risk of being crumpled and/or damaged by the auxiliary roller 130 with its rotation and, accordingly, of compromising the proper feeding of the sheets 14 from the ream 18.

6 Claims, 4 Drawing Sheets

DEVICE FOR THE PICKING AND FEEDING OF SHEETS FROM A REAM

FIELD OF THE INVENTION

This invention relates to a device for picking and feeding a single sheet at a time from a ream accommodated in a tray, preferably though not exclusively suitable for being used in the field of printers, and in particular provided with improvements with respect to devices with similar characteristics developed previously.

In further detail, the device of the invention is of the type comprising a tray containing a ream consisting of a plurality of sheets; a main rotating, feeding roller, and at least one auxiliary roller arranged adjacent to the feeding roller, wherein the tray is normally at a distance from the main feeding roller and is suitable for moving in order to cyclically bring the ream into contact with the latter, so that the sheets of the ream are separated one at a time and fed along a path in a feeding direction conforming to the direction of rotation of the main feeding roller, and wherein furthermore the auxiliary roller is suitable for cooperating with the main feeding roller, by rotating in contact with the sheets thus separated from the ream but in the opposite direction to their feeding direction along the path, to prevent the separating from the ream and the feeding along this path of double sheets by said main feeding roller.

BACKGROUND OF THE INVENTION

A feeding device integrated in an ink jet printer, with the purpose of picking and feeding the sheets from a tray along a printing path towards an ink jet printhead with which the printer is provided, and having substantially the characteristics specified above, is described in an European patent application previously filed by the Applicant and published with No. EP 0 873 876.

In detail, in this previous device, the tray is arranged according to a substantially vertical orientation, so that the sheets of the ream rest and are aligned, through the effect of their weight, against a back wall of the tray. In particular, the sheets are aligned against this back wall along the respective front edges, by means of which the sheets access the printing path. During the approach motion of the tray to the main feeding roller, the front edges of the sheets travel a predetermined path, along which they come into contact with the auxiliary roller, which in turn, being connected in the rotation to the same members that control the movement of the tray, rotates jointly with the approach motion of the latter.

Accordingly this device has the non-negligible drawback that the sheets of the ream can crumple and bend, or even just become deformed, local to their front edge, by coming into contact and sliding against the auxiliary roller, while it rotates, with the risk of accordingly compromising the regular picking of one sheet at a time from the ream and its correct feeding along the printing path by means of the main feeding roller.

In addition, there is the further drawback that the possible crumplings of the front edge produce interference and slide against the printhead, thus dirtying the sheets and/or at any rate causing visible defects thereon, liable to have a negative influence on the quality of printing obtainable using the printer.

Also, the above-mentioned device uses a monodirectional bushing, also called free wheel, for controlling the line feed motion of the sheets during their printing, its function being to connect in rotation a main feeding gear, in turn made revolve by a main motor, with a main feeding roller in contact engagement with the sheets for feeding them along the printing path, only when the main feeding gear rotates in a predetermined direction, leaving it free to rotate with respect to the main feeding roller, when the main feeding gear rotates in the opposite direction.

This solution has the drawback that when the main feeding gear stops at the end of each elementary rotation defining the pitch of the line feed motion of the sheets, the feeding roller tends by inertia to advance at an angle beyond the feeding gear, even though only to a very small extent, determining an error in the line feed motion pitch. As a result, this error, accumulating with other successive ones, may significantly reduce the quality of printing obtainable on the sheets, especially when the dot printing produced with the ink jet head is of the high definition type, and accordingly requires, for best results, the line feed motion of the sheets to be extremely precise, in order to permit the depositing of the droplets ejected by the ink jet head with absolute exactness on the sheets.

SUMMARY OF THE INVENTION

The object of this invention is therefore to produce a device for feeding a single sheet at a time from a ream of sheets contained in a tray, which overcomes the limitations and drawbacks described above and present in previously developed devices, such as in particular the one described in the afore-mentioned patent application filed by the Applicant.

This object is achieved by the device for the feeding of single sheets from a tray having the characteristics defined in the main claim.

BRIEF DESCRIPTION OF THE DRAWINGS

These and other characteristics of this invention will be apparent from the description that follows of the preferred embodiment, provided purely by way of an illustrative, non-restrictive example, and with reference to the accompanying drawings, where.

DESCRIPTION OF A PREFERRED EMBODIMENT OF THE INVENTION

Figure 1:
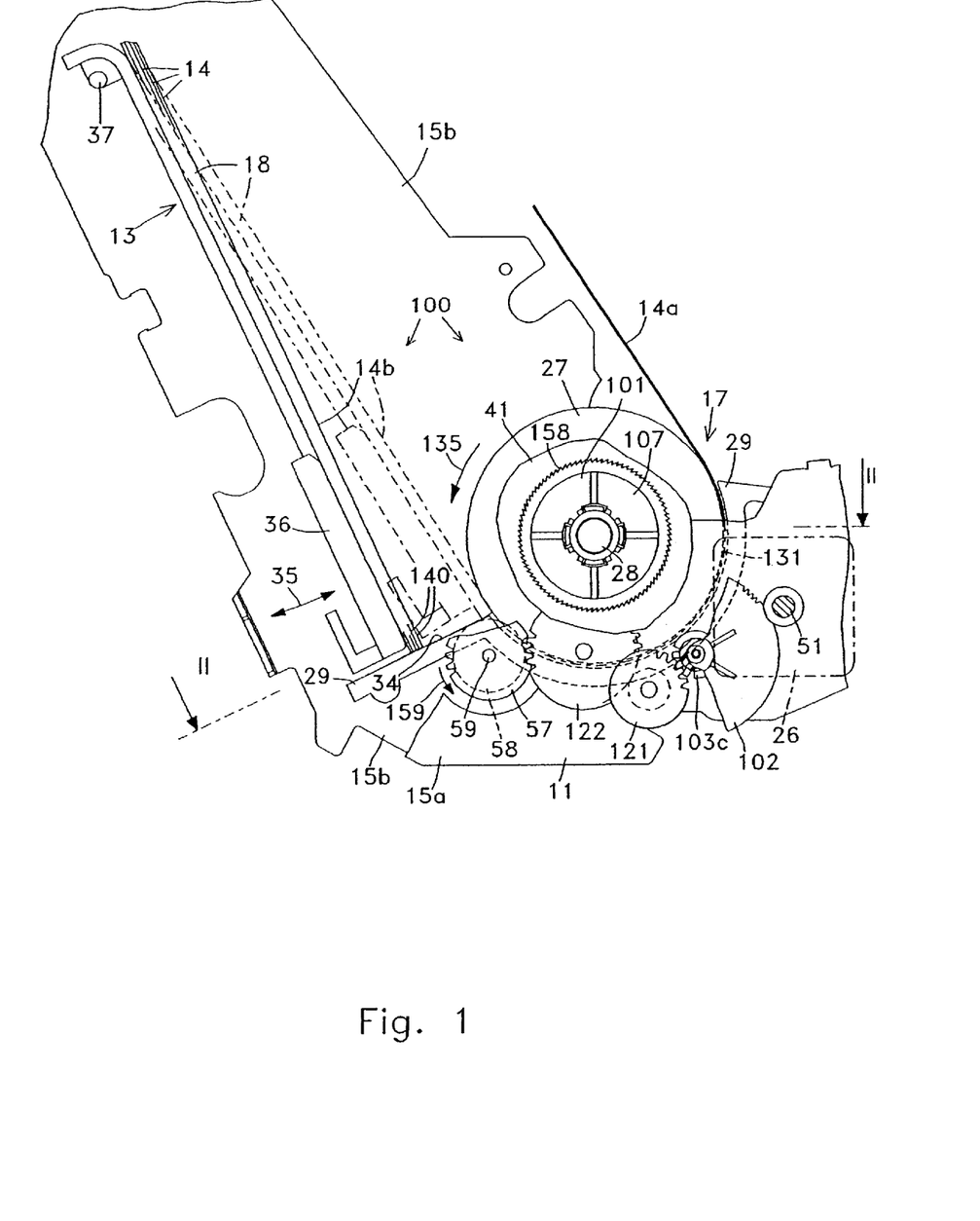
FIG. 1 is a lateral, schematic view, with some parts removed, of a device, according to this invention, for feeding a single sheet at a time from a movable tray.
Figure 2:
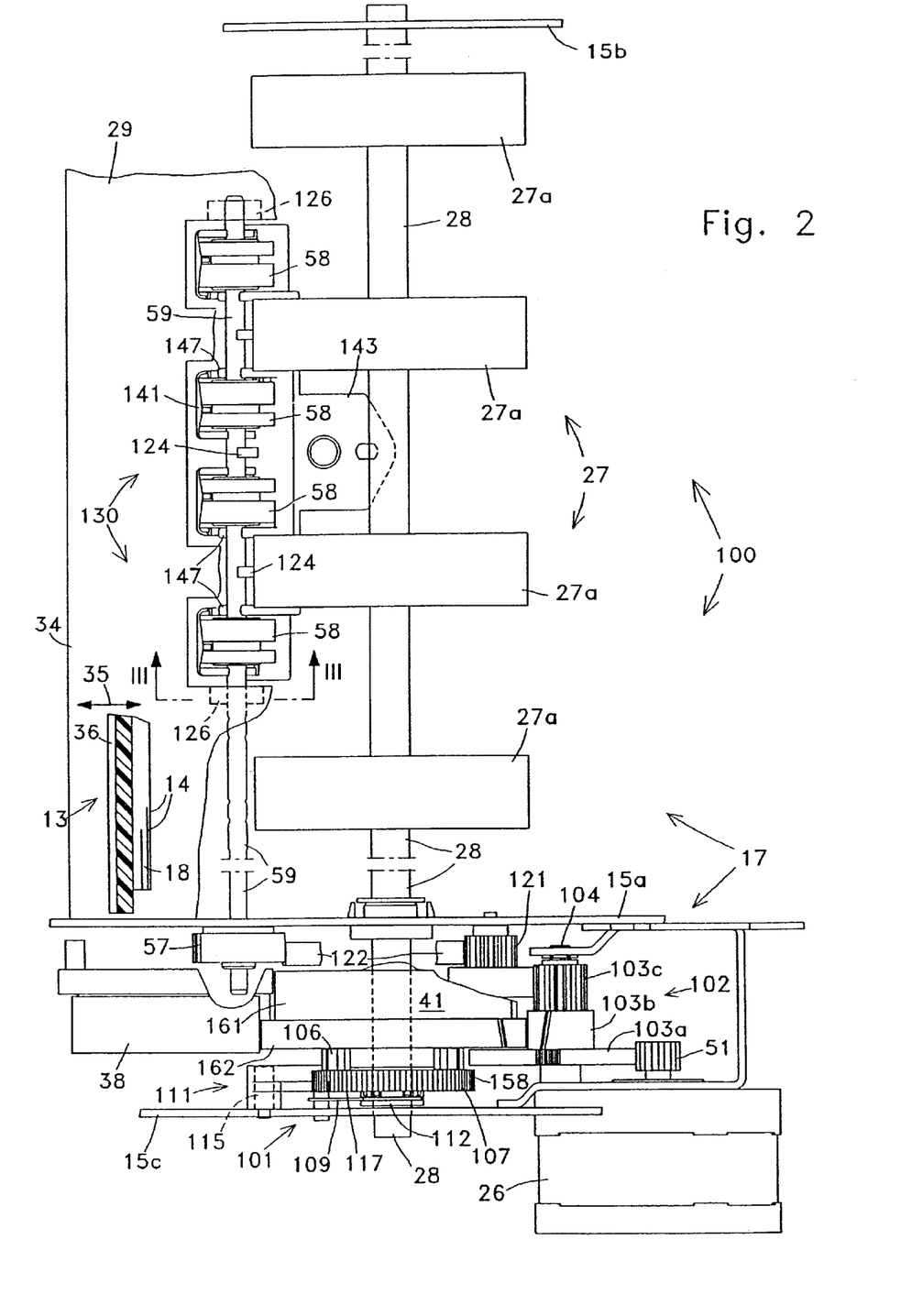
FIG. 2 is a schematic, plan view according to the line II—II of FIG. 1.

With reference to FIGS. 1 and 2 a device according to this invention for the feeding of single sheets from a ream 18, consisting of a plurality of sheets 14 stacked one on top of the other, is indicated with the numeral 100. The device 100 is particularly, though not exclusively, suitable for being incorporated in a printer, for example an ink jet printer, and represents a significant improvement with respect to the device for the feeding of sheets which is described in the European patent application No. EP 0 873 876, cited above, filed by the same Applicant.

For this reason the present description will use the same reference numerals to indicate parts similar and corresponding to those already introduced and defined in the said prior application.

It remains understood that, for details and clarification further to what is described and discussed herein, reference may be made to the subject matter of the above-mentioned patent application.

In particular, the device 100 comprises a fixed frame 11, having two sides 15*a* and 15*b,* which also constitutes the frame of the printer in which the device 100 is integrated; a feeding mechanism, generically indicated with the numeral 17, suitable for cooperating in contact with the ream 18 for picking therefrom one at a time the sheets 14 and for feeding them towards a printing assembly, not depicted in the drawings as it is not closely related to this invention; and a feeding tray 13 wherein the ream 18 is accommodated.

The feeding mechanism 17 comprises a main feeding gear 41, also called central control member, presenting on its periphery a plurality of coaxial crown wheels, which is suitable for being rotated by a main motor 26, typically a step motor, through a mechanical linkage, described later in detail, which connects the main motor 26 with the central control member 41.

The feeding mechanism 17 also comprises a main feeding roller 27, consisting of a plurality of disk-shaped feeding elements 27*a* (for example 4, as shown in FIG. 2); a shaft 28 suitable for rotating on the sides 15*a* and 15*b* of the fixed frame 11 and bearing integrally the elements 27*a* and rotatingly the central control member 41; a clutching control group 101 having the function of selectively coupling or uncoupling in rotation the shaft 28, and accordingly the main feeding roller 27, with the central control member 41; and an auxiliary roller 130, also called refusing roller, suitable for preventing the feeding of double sheets from the ream 18.

The main feeding roller 27 is arranged between the feeding tray 13 and the printing assembly for conveying towards the latter along a printing path 131 one at a time the sheets 14 of the ream 18 accommodated in the tray 13. For this purpose, the feeding elements 27*a* are suitable for cooperating with a conveying profile 29 integral with the frame 11 and having a shape that partially envelops the feeding elements 27*a* to define the path 131. Furthermore, the sheets 14 are obliged to follow the printing path 131 by way of a series of contrast wheels, not depicted in the drawings, freely rotating on the profile 29 and pressed resiliently against the feeding elements 27*a*.

The gear train adapted for transmitting the rotational motion from the main motor 26 to the central control member 41 also serves to reduce the latter's angular speed with respect to that of the motor 26, and is made up, as is clearly visible in FIG. 2, of a pinion 51 mounted on a shaft of the main motor 26, and an intermediate gearwheel 102, freely rotating on a shaft 104, having a first crown wheel 103*a* meshed with the pinion 51, and a second, helical crown wheel 103*b* meshed with the central control member 41. The intermediate gearwheel 102 also bears integrally, towards the side 15*a,* a third crown wheel 103*c* adapted for commanding the mechanical linkage which transmits the motion to the auxiliary roller 130, as is better described below.

Figure 4:
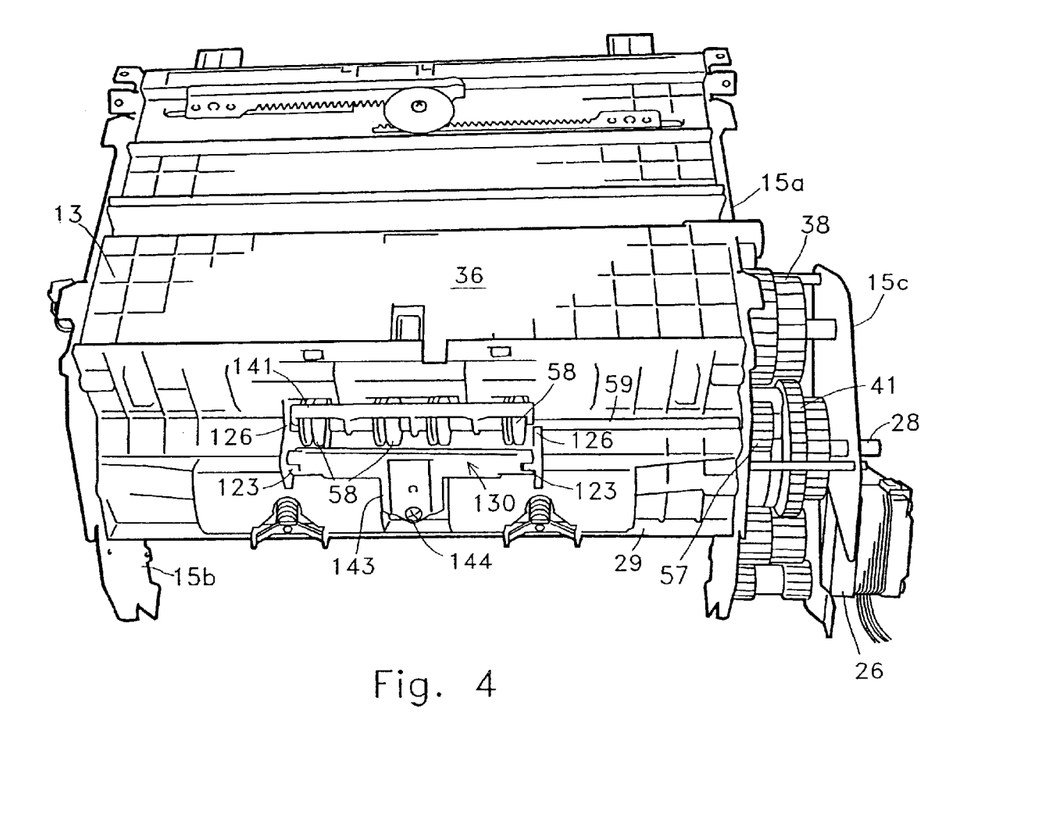
FIG. 4 is a perspective view, as a whole and from the rear, of a printer incorporating the device of the invention, and in particular the details of FIG. 3.

The auxiliary roller 130 is arranged parallel and adjacent to the main feeding roller 27, comprises a shaft 59, upon one end of which a cogwheel 57 has been fitted, and four counter-rotating rollers 58, also called refusing rollers, mounted on the shaft 59; and is suitable for being rotated by the main motor 26 by means of a gear train connecting the pinion 51 with the gearwheel 57. In particular, this gear train is made up of the afore-mentioned crown wheel 103*c* of the intermediate gearwheel 102, and the gearwheels 121 and 122 mounted idly on pins integral with the side 15*a*. The shaft 59 is rotatingly supported by projecting tabs 126 formed on the outside of the conveying profile 29, as is clearly visible in FIG. 4, and is engaged by a number of forks 147 of a regulating member 143 in order to be held in position.

It must be stressed that the mechanical linkage through which the auxiliary roller 130 receives its motion from the motor 26 is completely distinct from and does not comprise the central control member 41. In this way, the latter is not subject to any load induced by the rotation of the auxiliary roller 130, that could alter the precision of the rotational motion of the same control member 41, and therefore of the feeding motion of the sheets 14.

The four counter-rotating rollers 58 are staggered with respect to the feeding elements 27*a* and are so called because, as will be seen better in the following, in use they rotate in the opposite direction to the feeding direction of the sheets 14 to prevent the feeding of double sheets from the feeding tray 13. In particular, the counter-rotating rollers 58 are arranged for sliding, by rotating, on the face of the sheets 14 opposite that which comes into contact with the main feeding roller 27, and to this end are disposed in such a way as to have, when observed laterally, an albeit small radial interference IN (FIG. 3) with the elements 27*a*. This slight interference ensures the contact in all cases and a sufficient sliding action between the counter-rotating rollers 58 and the sheets 14, during the feeding motion of the latter.

The regulating member 143 is mounted on a fulcrum 123 consisting of the conveying profile 29, and is furthermore blocked in position with respect to the latter by a screw 144, against which the regulating member 143 is urged by a spring 146. Accordingly, by tightening the screw 144 to a greater or lesser extent, it is possible to rotate the regulating member 143 about the fulcrum 123 so as to alter its inclination with respect to the conveying profile 29, and consequently to regulate, by way of the forks 147, the radial interference IN of the rollers 58 with respect to the feeding elements 27.

In particular, the regulation of the interference IN is effected during assembly of the printer wherein the device 100 is integrated, with the object of guaranteeing the maximum effectiveness of the refusing rollers 58 in order to avoid the feeding of double sheets.

Moreover the spring 146 permits the counter-rotating rollers 58 to move resiliently with respect to the feeding elements 27*a,* so as to automatically adjust the interference IN between the latter-named and the rollers 58 in relation to the typical rigidity of the sheets 14 which are fed by the feeding roller 27.

According to a main characteristic of the device 100 of the invention, the latter is provided with expedients suitable for preventing the front edge of the sheets 14 stored in the tray 13 coming into contact, during the motion of the ream 18 with respect to the main feeding roller 27, with the refusing rollers 58 adapted for rotating in the direction opposite the feeding direction of the sheets 14 to avoid the feeding of double sheets.

In particular, the auxiliary roller 130 is associated with a cap 141 shaped so as to partially cover the four refusing rollers 58 and mounted rotatingly by way of tabs 124 with a slight interference on the shaft 59, so as to be able to rotate on the latter-named with a slight friction.

Figure 3:
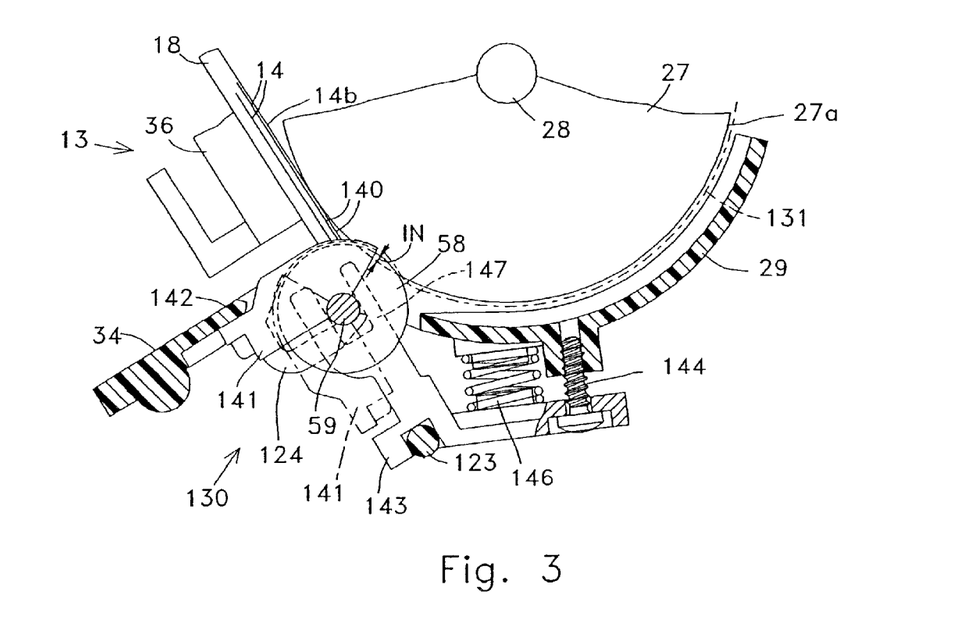
FIG. 3 is an enlarged scale, section view according to the line III—III of FIG. 2, of some details of the device of the invention, in a working position.

Moreover, as illustrated in FIG. 3, the rotation of the cap 141 about the shaft 59 is limited on the one hand by an abutment 142 formed by the bottom wall 34 and on the other by the regulating member 143.

The control group 101 is placed between the shaft 28 and the central control member 41 and has the function of making them integral in rotation only when the control member 41 rotates in the anticlockwise direction for feeding the sheets 14, as indicated by the arrow 135 in FIG. 1.

As can be seen clearly in FIGS. 5 and 6, the control group 101 is accommodated inside a cylindrical seat 110 made in the central control member 41, and comprises a hub 106 keyed by means of a screw 105 onto one end of the shaft 28; a toothed flange 107 mounted freely rotatingly on the shaft 28; four rollers 108a, 108b, 108c, and 10d, also called in the following engaging members; and a control element 109 mounted rotatingly on a sleeve 112 of the toothed flange 107 and adapted for controlling an escapement 111.

The four rollers are divided into two pairs of rollers 108a, 108b and 108c, 108d accommodated in two respective housings 151 and 152, each of which is defined between a corresponding cylindrical surface 153 made on the outer periphery of the hub 106 and the inner surface of the cylindrical seat 110.

In particular, the radii of curvature of the inner surface of the seat 110 and of the surfaces 153 are such as to determine a height of the housings 151 and 152, measured along the radial extension of the control group 101, having a maximal value greater than the diameter of the rollers 108a–108d at the centre of each housing and tending to decrease gradually from the centre towards the sides of the housing, until becoming less than the diameter of the rollers 108a–108d, in such a way that the latter are free to move inside the corresponding housings but prevented from exiting therefrom.

Furthermore the two rollers 108a, 108b and 108c, 108d of each pair are held separate and urged apart from each other by a spring 154 placed between them, while the springs 154 and the rollers 108a–108d are retained inside the respective housings by protrusions 155 formed on the periphery of the hub 106.

The toothed flange 107 is provided with two tabs 113a and 113b, also called releasing members on account of their intended function, as will become clear in the following, which extend on the inside of two respective chambers 156 and 157, which are in turn defined between the inner cylindrical surface of the seat 110 and the outer periphery of the hub 106, and are arranged alternatingly with the two housings 151 and 152, described above, wherein the rollers 108a–108d are accommodated.

The control element 109 has the form of a protruding arm and is made of a metal wire wound with some interference about the sleeve 112 so as to be able to rotate with a certain friction about the latter.

The escapement 111 is supported by a plate 15c of the frame 11, arranged parallel to the side 15a, and in particular comprises a lever with two arms fulcrum-mounted centrally on the side 15c by way of a hinge-pin 115, and having a first arm 118 connected with the control element 109 by means of a pin 116 formed on the free end of the arm 118, and a second arm 117 terminated in a tooth suitable for cooperating with an external toothing 158 of the flange 107.

With reference to FIG. 1, the feeding tray 13 is disposed with an upwardly inclined orientation and comprises a bottom wall 34, which is made of a single piece with the conveying profile 29 and against which the sheets 14, once arranged in the tray 13, come to rest at the bottom through the effect of their weight, and a movable wall 36 fulcrum-mounted on the fixed frame 11 by means of a hinge-pin 37.

In particular, the sheets 14 are aligned against the bottom wall 34 along their front edge 140, thus called because it defines the zone of each sheet 14 that is first to come into contact with the feeding roller 27 and access the printing path 131.

The movable wall 36 is suitable for being selectively rotated about the hinge-pin 37, as shown by arrows 35, so as to approach or withdraw from the feeding roller 27, by means of a control mechanism 38, only partially depicted in FIG. 2, which is in turn arranged to be actuated by and to receive motion from the main motor 26.

The preferred embodiment of this control mechanism 38 will not be described in detail here nor depicted in the drawings, its characteristics having already been presented comprehensively in the above-mentioned patent application.

For the sake of clarity, we shall restrict ourselves here to saying that the control mechanism 38, in the preferred embodiment recalled above, is arranged to be actuated directly by the central control member 41 through two of its crown wheels 161 and 162, and in particular it is suitable for producing a predetermined rotation in the anticlockwise direction of the wall 36 about the hinge-pin 37, in order to bring the ream 18 into contact with the main feeding roller 27, when the control member 41 rotates in the clockwise direction; and further a predetermined rotation in the clockwise direction of the wall 36, so as to move the ream 18 away from the main roller 27 and bring it into the starting position when the control member 41 rotates in the anticlockwise direction.

Moreover, at the end of the predetermined rotation in the clockwise direction of the movable wall 36, the control mechanism 38 is suitable for decoupling the connection between the same wall 36 and the central control member 41, leaving the latter free to continue to rotate in the anticlockwise direction for feeding the sheets 14 along the path 131. As already said, for further details about this control mechanism, see the above-mentioned patent application.

MODE OF OPERATION OF THE INVENTION

Operation of the device 100 described thus far is as follows.

It is assumed to begin with that the device 100 is in a condition, depicted with an unbroken line in FIG. 1, with the tray 13 at a distance from the feeding roller 27, wherein a generic sheet 14a is pulled by the rotation of the main feeding roller 27 for feeding according to a line feed motion along the printing path 131, in such a way as to complete its feeding and printing cycle, as established by the general operating program that controls the printer in which the device 100 is integrated.

In this stage, the motor 26 turns intermittently to command a succession of micro-rotations in the anticlockwise direction of the central control member 41, each corresponding to one pitch of the line feed motion of the sheet 14a, as indicated by the arrow 135. The anticlockwise rotation of the control member 41 determines the torsional coupling between the same control member 41 and the shaft 28, which accordingly rotate together intermittently, as imposed by the motor 26.

Figure 5:
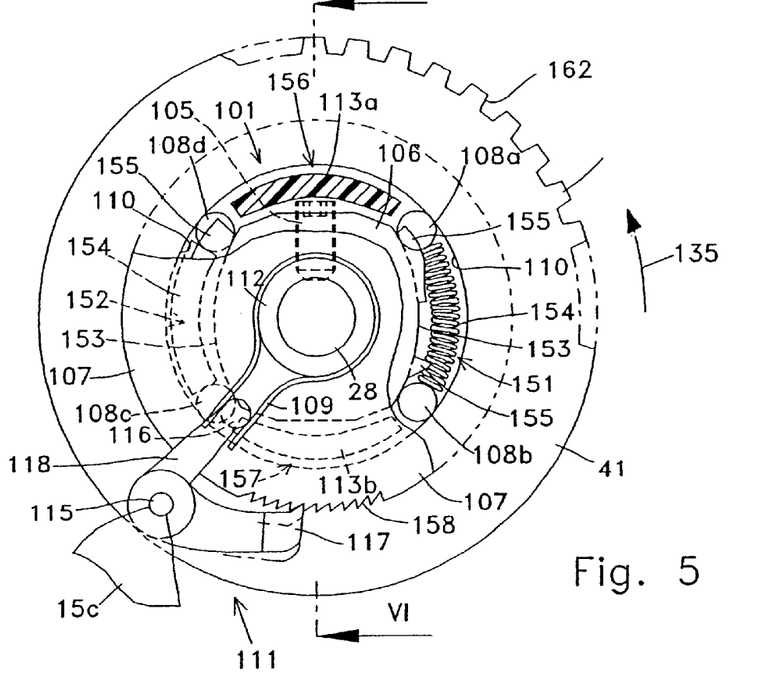
FIG. 5 is a schematic, front view of a clutching control group used by the device of the invention for feeding the sheets.
Figure 6:
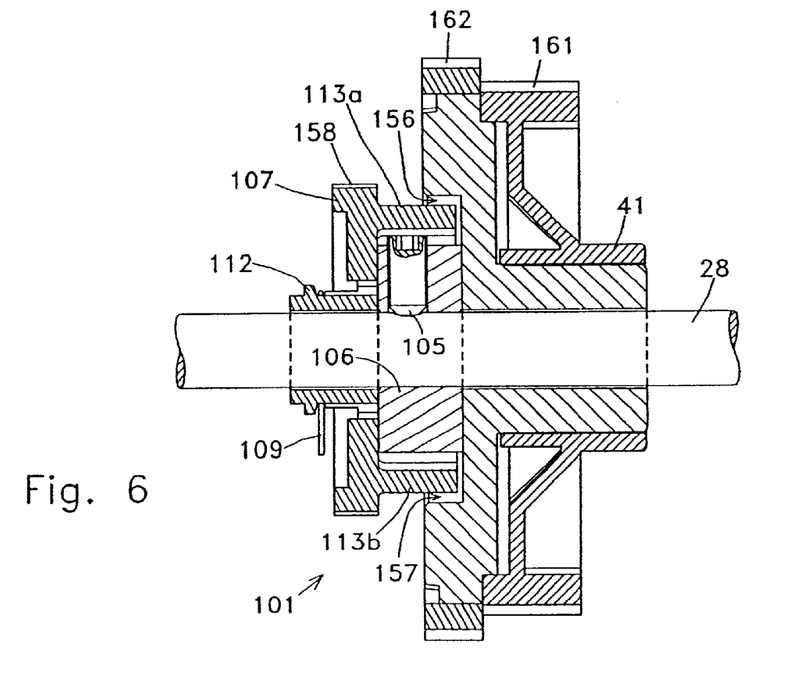
FIG. 6 is a section according to the line VI—VI indicated in FIG. 5.

In fact, with reference to FIG. 5, the anticlockwise rotation of the control member 41 tends to force the rollers 108a and 108c between the cylindrical surface of the seat 110 and the surfaces 153 of the hub 106, at the sides of the respective housing 151 and 152 wherein the same rollers 108a and 108c are accommodated, so as to make the central control member 41 integral with the hub 106 mounted on the shaft 28.

Moreover, and still in this stage, on account of the anticlockwise rotation of the central control member 41, the force that is transmitted to the escapement 111 by the control element 109 and which is produced by the sliding between the latter and the sleeve 112, is such as to maintain constantly raised the arm 107 from the toothing 158 of the flange 107, which is thus free to follow in rotation the hub 106 and the control member 41.

Additionally at the end of each elementary rotation of the control member 41, the feeding roller 27 is prevented from advancing by inertia beyond the control member 41, by virtue of the action that the rollers 108b and 108d exert on the hub 106 and which is such as to hold back the latter with respect to the seat 110.

As it happens, at the time the control member 41 stops, the rollers 108b and 108d, which are already in contact with the cylindrical surface of the seat 110 and the surfaces 153 under the action of the springs 154, tend to force themselves even more between these surfaces, at the sides of the respective housings 151 and 152, so as to block all further forward rotation of the hub 106 and therefore of the feeding roller 27 with respect to the control member 41.

In this way the central control member 41 and the main feeding roller 27 stop simultaneously, after each elementary line feed, without even the slightest further rotation because of inertia of the roller 27, thus guaranteeing an absolute precision of the line feed motion of the sheet 14a.

Furthermore the motor 26, through the train of gearwheels 102, 121, 122 and 57, commands a rotation of the refusing rollers 58 of the auxiliary roller 130 in the anticlockwise direction, as indicated by the arrow 159, and therefore in the direction opposite to the feeding direction conforming to the direction of rotation 135 of the sheet 14a along the path 131. This anticlockwise rotation of the refusing rollers 58, though producing a certain force of tangential friction on the sheet 14a which opposes its feeding, is not sufficient to disturb the normal feeding of the sheet 14a under the prevailing feeding action exerted on the latter by the main feeding roller 27.

In addition, the anticlockwise rotation of the shaft 59 of the auxiliary roller 130 keeps the cap 141 constantly in an idle position, depicted with the dot and dash line in FIG. 3, in which the cap 141 leaves the portions of the refusing rollers 58 facing the bottom wall 34 fully uncovered.

In particular, in the above-mentioned rest position, the cap 141 is continuously thrust against the regulating member 143 by the friction torque produced by the rotation of the shaft 59 with respect to the tabs 124, by means of which the same cap 141 is fitted slidingly, but with a slight interference, on the shaft 59.

When, within the context of the more general operating cycle recalled above, it is necessary to feed to the printing assembly a new sheet 14b from the ream accommodated in the tray 13 the motor 26 stops and inverts its direction of rotation, causing a rotation in the clockwise direction of the control member 41 and the almost immediate torsional uncoupling between the latter and the shaft 28, which thus stops almost immediately.

In particular, the clockwise rotation of the control member 41, by means of the rollers 108b and 108d in contact with the releasing members 113a and 113b, initially drags into rotation the flange 107, also in the clockwise direction, which in turn, through the control element 109, commands the escapement 111 so that it brings the tooth 117 to engagement with the toothing 158, in order to immediately block the incipient clockwise rotation of the flange 107.

As a result, the flange 107 practically remains motionless, and in this way causes, due to the releasing members 113a and 113b meshing with the rollers 108b and 108d, the disengagement of the latter-named from the surfaces of the corresponding housings 151 and 151, by pushing the rollers 108b and 108d towards the centre of the housings 151 and 152, so that the central control member 41 disconnects in rotation from the hub 106.

In particular, in this stage, the releasing members 113a and 113b exert a force on the rollers 108b and 108d intended to directly oppose the action exerted by the springs 154 on the same rollers 108b and 108d to wedge them between the surfaces of the housings 151 and 152, so that the rollers 108b and 108d are continuously prevented from connecting the control member 41 with the hub 106 in rotation, and therefore slide with respect to the seat 110 rotating in the clockwise direction with the control member 41.

In addition, the clockwise rotation of the control member 41 is freely permitted by the rollers 108a and 108c. The latter in fact, unlike in the previous case of anticlockwise rotation of the same control member 41, are prevented from being forced between the surfaces of the respective housings 151 and 152, the rollers 108a and 108c being constantly pushed by the sides towards the centre of the housings 151 and 152, on account of the force of friction exerted on them by the seat 110 while it rotates in the clockwise direction.

At this point, the central control member 41, now disconnected from the hub 106, continues to rotate in the clockwise direction to command the approach motion of the tray 13 so as to bring a new sheet 14b, which corresponds to the sheet disposed at that time at the top of the ream 18, into contact with the feeding roller 27, while the latter remains motionless integrally with the shaft 28 in the position reached at the end of the preceding anticlockwise rotation of the control member 41.

In particular, the control member 41, in response to a corresponding rotation of the motor 26, effects a predetermined rotation in the clockwise direction which commands a rotation of the movable wall 36 of the tray 13 about the fulcrum 37, towards the main feeding roller 27, by means of the control mechanism 38 described in detail in the already cited patent application filed by the Applicant.

Simultaneously the rotation of the motor 26 determines, by means of the mechanical linkage consisting of the gearwheels 102, 121, 122, and 57, a clockwise rotation of the shaft 59 and therefore of the refusing rollers 58.

Consequently the cap 141, under the action of the friction torque exerted by the shaft 59 on the tabs 124, abandons the idle position it was in, against the regulating member 143, and also rotates in the clockwise direction together with the shaft 59 until it reaches a working position, depicted with the unbroken line in FIG. 5, wherein the cap 141 is resting against the abutment 142 and completely covers those portions of the refusing rollers 58 facing the bottom wall 34.

The movement of the cap 141 to cover the refusing rollers 58 is synchronized with that of the movable wall 36, so that it is always in advance of the sliding motion of the ream along the bottom wall 34, caused by the rotation of the same wall 36.

In this way, the front edges 140 of the sheets 14, while they are advancing along the path that will bring them into contact with the feeding roller 27, pass above the cap 141, and therefore never touch the refusing rollers 58 rotating in the clockwise direction.

Accordingly the front edge 140 of each sheet 14 comes into contact with the elements 27a without running the risk of first being bent, crumnpled or deformed by the rotation of the refusing rollers 58 or simply by friction with the latter.

When the new sheet 14b is securely meshing with the feeding roller 27 and in accordance with the provisions of the printer control program, the motor 26 invert its direction of rotation, so that the control member 41 rotates again in the anticlockwise direction, connecting once more with the hub 106 to feed the sheet 14b along the path 131 according to a line feed motion.

In particular, the anticlockwise rotation of the control member 41 tends to force the rollers 108a and 108c between the surfaces of the housings 151 and 152 in order to integrally couple the same control member 41 with the hub 106, and also brings the rollers 108a and 108c back into engagement with the releasing members 113a and 113b, in order to drag both them and the flange 107 into rotation in the anticlockwise direction.

As an immediate consequence of the rotation in the anticlockwise direction of the flange 107 there is an inversion of the direction of the friction torque exerted by the flange 107 through the sleeve 112 on the control element 109, so that the latter is promptly activated for commanding via the escapement 111 the disengagement of the tooth 117 from the toothing 158, as indicated by the dot and dash line in FIG. 5, thus permitting the flange 107 to continue rotating freely in the anticlockwise direction together with the control member 41.

While the main feeding roller 27 rotates in the anticlockwise direction to feed the new sheet 14b, the control member 41 causes, via the train of gearwheels 102, 121, 122, and 57, the anticlockwise rotation of the shaft 59 and of the counter-rotating rollers 58 mounted thereon, according to the direction of the arrow 159. The result is that the rollers 58 renew, in this case on the surface of the sheet 14b not in contact with the feeding roller 27, their sliding action by operating according to a direction opposite to that of feeding of the sheet 14b, and intended to prevent the latter from dragging with it another sheet, giving rise to the so-called drawback of double sheet feeding. Naturally, as already said, the rotation of the rollers 58 contrary to the feeding direction of the sheets 14 is incapable of interfering with or disturbing in any way their effective feeding, the force that the counter-rotating rollers 58 are capable of applying to the sheets 14 to prevent the drawback of double sheets being considerably less than that applied by the feeding elements 27a and by the corresponding contrast wheels arranged along the path 131.

The anticlockwise rotation of the shaft 59 again restores the rotation of the cap 141, moving it from the end position in contact with the abutment 142 to the other end position against the regulating member 143. In this way the cap 141 again uncovers the portions of the rollers 58 facing the bottom wall 34, while the ream 18 withdraws towards its rest position removed from the feeding roller 27.

Contrary to what happened previously during the approach motion of the ream 18 to the main feeding roller 27, the uncovering of the portions of the refusing rollers 58 facing the bottom wall 34 takes place at a time subsequent to the passage of the ream 18 above the cap 141, so that in no case do the front edges 140 of the sheets 14 have the possibility of coming into contact with the refusing rollers 58.

At this point, at the end of the complete feeding of the sheet 14b, the operating cycle described above is obviously repeated, with the object of picking a next sheet 14 from the ream 18 and feeding it along the path 131, and so on cyclically for as long as determined by the printer control program.

It remains understood that changes and/or improvements may be made to the device for picking and feeding sheets from a ream described up to this point, without departing from the scope of this invention.

What we claim is:

1. A device for picking one at a time a plurality of sheets from a ream and feeding them along a path, said sheets being reciprocally aligned in said ream along respective front edges, comprising:

a rotating main feeding roller;

a tray in which said ream is accommodated, said tray being normally disposed at a distance from said main feeding roller, and being provided for moving in such a way as to cyclically bring said ream into contact with said main feeding roller in order to separate said sheets one at a time from said ream and to feed them along said path in a feeding direction conforming to the direction of rotation of said main feeding roller, said sheets coming into said path with the respective front edges;

at least one auxiliary roller arranged parallel and adjacent to said main feeding roller, said auxiliary roller being provided for cooperating, by rotating according to a direction of rotation opposite to said feeding direction, in contact with said sheets to permit their correct separation from the ream, in particular without the feeding of double sheets occurring; and protecting means capable of preventing any contact between the front edges of said sheets and said auxiliary roller during the motion of said tray to bring cyclically said ream into contact with said main roller, so as to protect said front edges from any damage produced by contact thereof with said auxiliary roller.

2. Device according to claim 1, wherein said front edges are provided for following in the two directions a predetermined operating path, along which said auxiliary roller is arranged, during the motion of the tray to bring the ream near to or away from said main feeding roller, and wherein said protecting means are capable of operating in synchronization with said motion of the tray to keep said front edges constantly separate from said auxiliary roller.

3. Device according to claim 1, wherein said auxiliary roller includes a plurality of refusing rollers staggered along said auxiliary roller with respect to corresponding feeding elements of said main feeding roller, said device further comprising:

regulating means provided for manually regulating the interference in the radial direction between said refusing rollers and said feeding elements; and elastic means associated with said refusing rollers to permit the latter to move resiliently with respect to said feeding elements so as to adapt said interference in relation to the rigidity of the sheets that are being fed.

4. Device according to claim 2, wherein said protecting means comprise a covering member arranged adjacent to said auxiliary roller, said covering member being capable of moving, with respect to the latter, in such a way as to cover a portion of said auxiliary roller facing said operating path, during the approach motion of said tray to said main feeding roller, and in such a way as to uncover said portion, during the withdrawal motion of said tray from said main feeding roller.

5. Device according to claim 4, wherein said auxiliary roller is constantly connected in rotation with the motion of said tray, and is therefore liable to invert its direction of rotation during said motion, and wherein said covering member consists of a cap mounted rotatingly, but with a certain friction, on a shaft of said auxiliary roller, said cap being provided for rotating about said shaft between two angular end positions defined by two abutments against which said cap stops, whereby, when said auxiliary roller rotates in accordance with a first direction of rotation corresponding to the approaching of said tray to said main feeding roller, said cap is consequently dragged into rotation through friction by said shaft until it stops against a first of said abutments, so as to cover said portion; and whereby, when said auxiliary roller rotates in accordance with a second direction of rotation, opposite the first, corresponding to the withdrawing of said tray from said main feeding roller, said cap is consequently dragged through friction into rotation by said shaft in the opposite direction to before until it stops against the second of said abutments, so as to uncover said portion.

6. Device according to claim 5, wherein said auxiliary roller comprises a plurality of refusing rollers mounted on said shaft, and said cap is shaped in such a way as to partially cover both at the sides and along the cylindrical periphery each of said refusing rollers.

* * * * *